United States Patent [19]

Mascia

[11] Patent Number: 5,452,935
[45] Date of Patent: Sep. 26, 1995

[54] VEHICULAR WINDSHIELD AND HOOD SEAL

[76] Inventor: Nicolas O. Mascia, 53 Rosehill Ave., Tarrytown, N.Y. 10591

[21] Appl. No.: 120,052

[22] Filed: Dec. 8, 1993

[51] Int. Cl.[6] .................................................. B60J 11/00
[52] U.S. Cl. ................. 296/136; 296/96.15; 15/250.001; 15/250.19; 15/250.3; 280/153.5; 280/770
[58] Field of Search .................. 280/153.5, 159, 280/770; 296/136, 96.15, 192; 15/250.001, 250.11, 250.1, 250.3, 250.19; 220/212.5, 237.

[56] References Cited

U.S. PATENT DOCUMENTS

| | | | |
|---|---|---|---|
| 13,945 | 7/1915 | McCormick | 280/153.5 |
| 2,947,020 | 8/1960 | Wilfert et al. | 15/250.3 |

FOREIGN PATENT DOCUMENTS 235157  8/1964  Austria ................................. 296/202

Primary Examiner—Dennis H. Pedder

[57] ABSTRACT

A flexible body arranged to be projected within the opening between an associated vehicular windshield and its hood is provided, having a bottom wall including a flexible registration boss to be sealingly projected into the opening, with a top wall having handle structure for ease of manipulation of the organization in placement relative to the vehicle. A modification of the invention includes flap members arranged for wiping of debris and precipitation relative to the vehicular windshield prior to removal of the body from the opening. A modified body structure is arranged to include a pneumatic chamber coextensive with the body to enhance sealing within the opening.

3 Claims, 4 Drawing Sheets

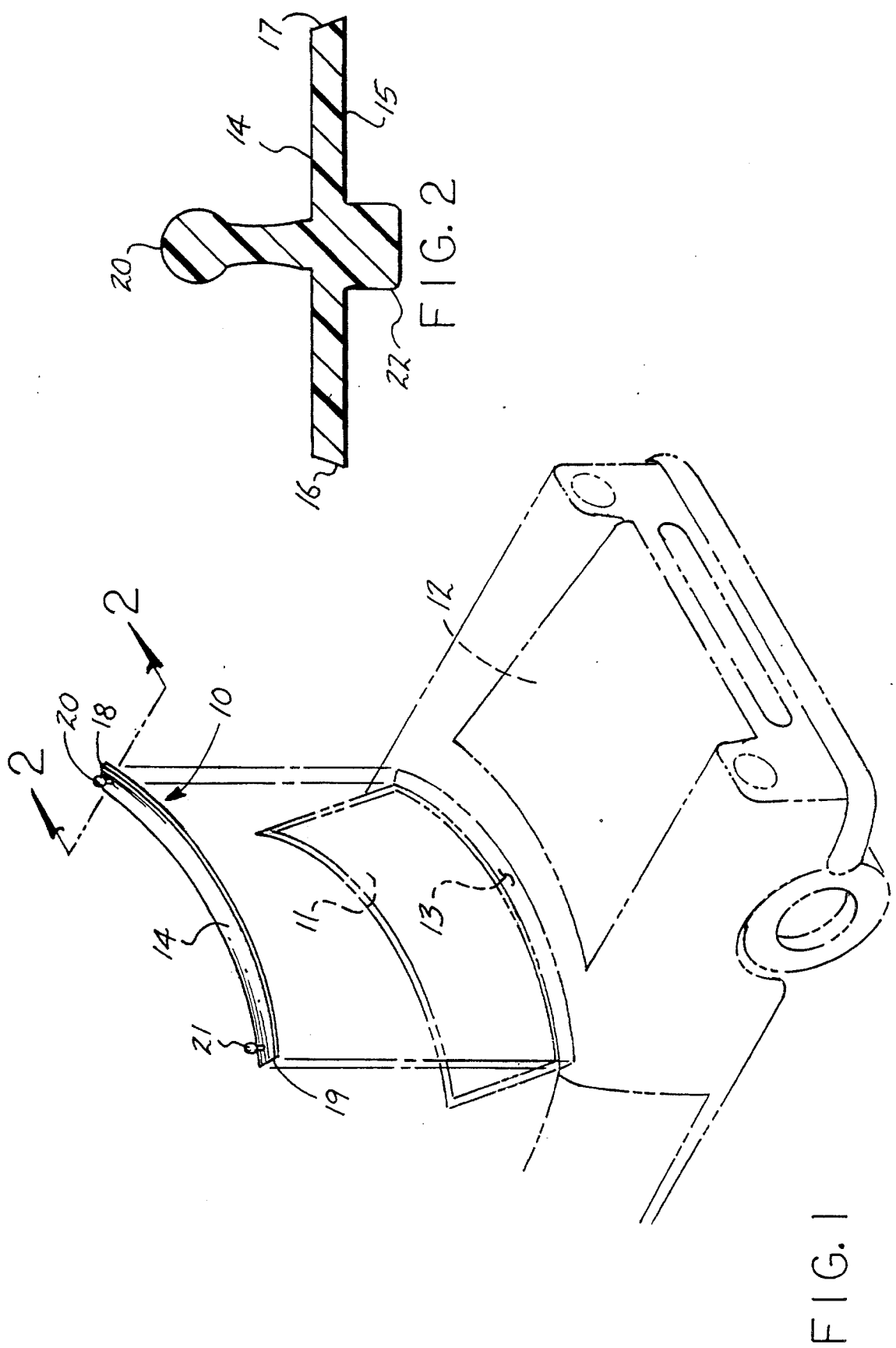

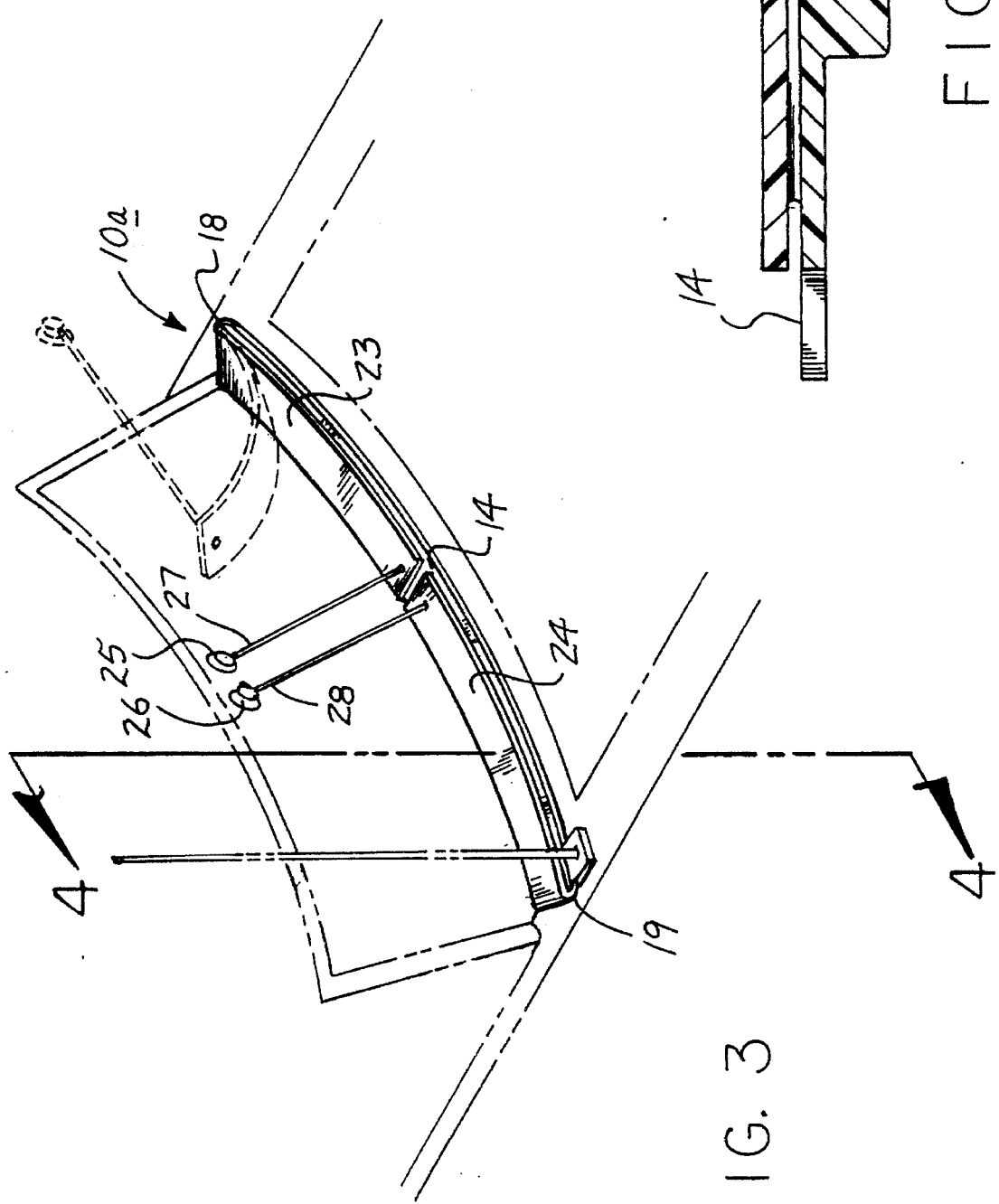

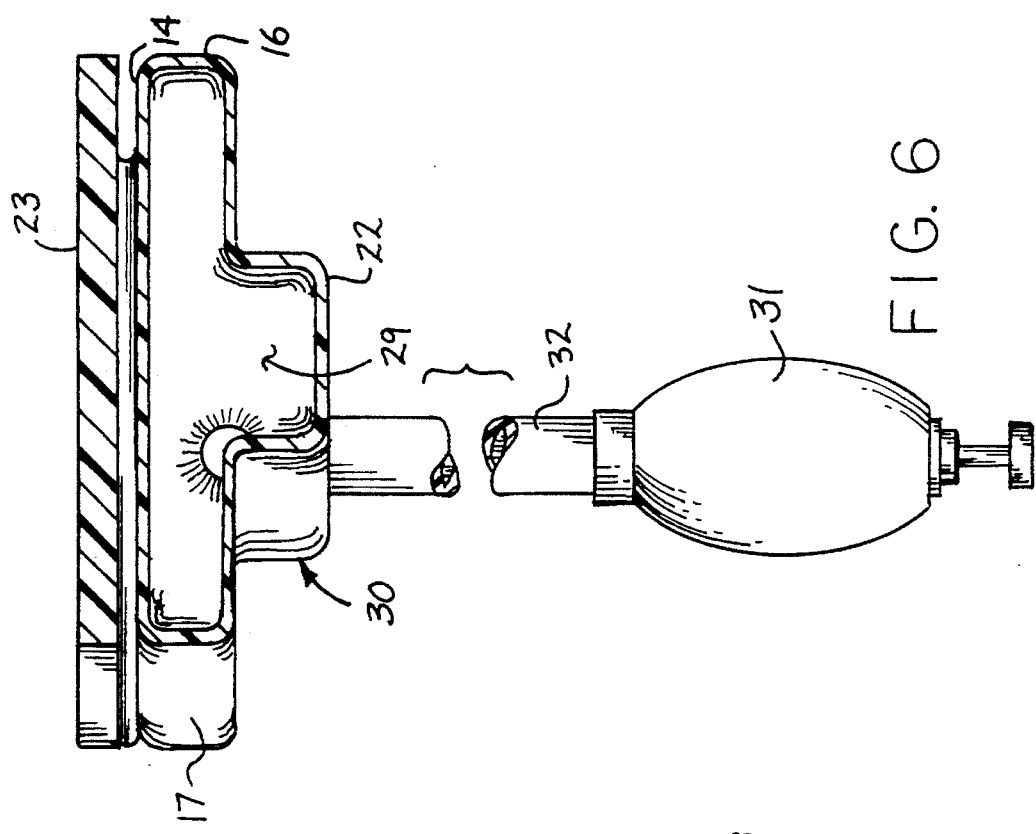
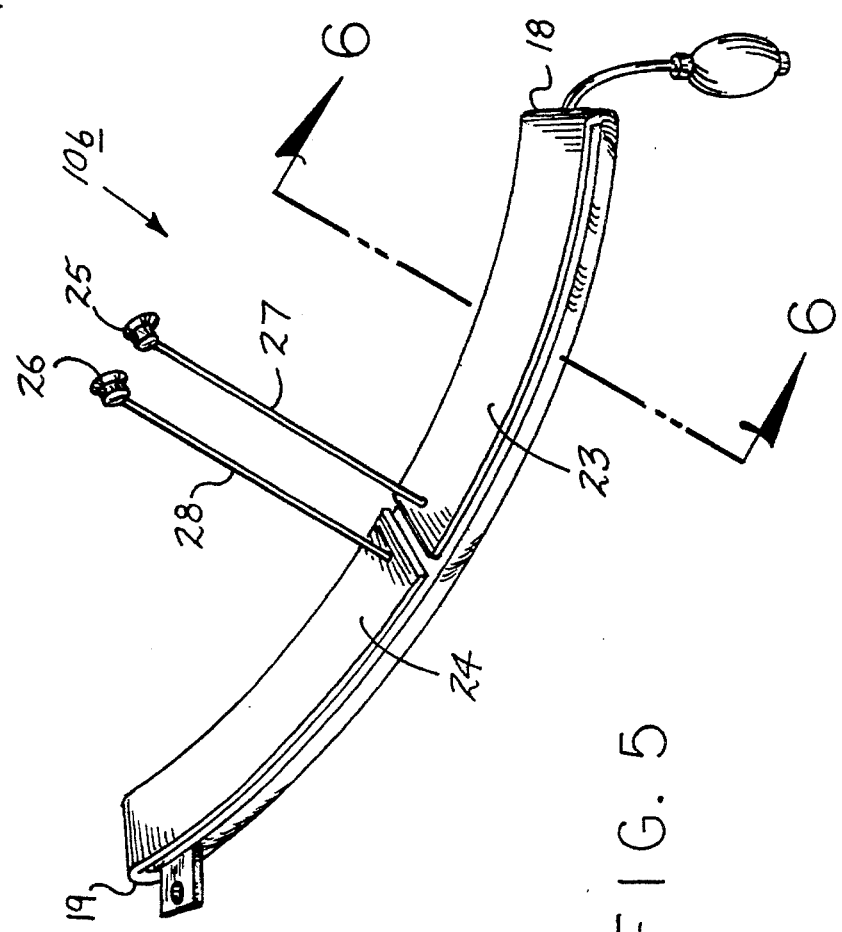
FIG. 6
FIG. 5

VEHICULAR WINDSHIELD AND HOOD SEAL

BACKGROUND OF THE INVENTION

1. Field of the Invention

The field of invention relates to windshield wiper well cover structure, and more particularly pertains to a new and improved vehicular windshield and hood seal arranged to interfit within the wiper welt of an associated vehicle.

2. Description of the Prior Art

The windshield well or opening positioned between the hood and the windshield is available for accumulation of various debris, wherein the instant invention permits the mounting of a removable seal within the opening preventing debris from entering such. To this end, the instant invention sets forth an improvement over the prior art by providing for an elongate flexible body arranged to sealingly interfit within the opening and in this respect, the present invention substantially fulfills this need.

SUMMARY OF THE INVENTION

In view of the foregoing disadvantages inherent in the known types of vehicular windshield seal structure now present in the prior art, the present invention provides a vehicular windshield and hood seal wherein the same is arranged to interfit within the opening to effect a sealing. As such, the general purpose of the present invention, which will be described subsequently in greater detail is to provide a new and improved vehicular windshield and hood seal which has all the advantages of the prior art vehicular sealing apparatus and none of the disadvantages.

To attain this, the present invention provides a flexible body arranged to be projected within the opening between an associated vehicular windshield and its hood, having a bottom wall including a flexible registration boss to be sealingly projected into the opening, with a top wall having handle structure for ease of manipulation of the organization in placement relative to the vehicle. A modification of the invention includes flap members arranged for wiping of debris and precipitation relative to the vehicular windshield prior to removal of the body from the opening. A modified body structure is arranged to include a pneumatic chamber coextensive with the body to enhance sealing within the opening.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular windshield and hood seal which has all the advantages of the prior art vehicular sealing apparatus and none of the disadvantages.

It is another object of the present invention to provide a new and improved vehicular windshield and hood seal which may be easily and efficiently manufactured and marketed.

It is a further object of the present invention to provide a new and improved vehicular windshield and hood seal which is of a durable and reliable construction.

An even further object of the present invention is to provide a new and improved vehicular windshield and hood seal which is susceptible of a low cost of manufacture with regard to both materials and labor, and which accordingly is then susceptible of low prices of sale to the consuming public, thereby making such vehicular windshield and hood seals economically available to the buying public.

Still yet another object of the present invention is to provide a new and improved vehicular windshield and hood seal which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is an orthographic view, taken along the lines 2—2 of FIG. 1 in the direction indicated by the arrows.

FIG. 3 is an isometric illustration of a modified aspect of the invention.

FIG. 4 is an orthographic view, taken along the lines 4—4 of FIG. 3 in the direction indicated by the arrows.

FIG. 5 is an isometric illustration of a further modified aspect of the invention.

FIG. 6 is an orthographic view, taken along the lines 6—6 of FIG. 5 in the direction indicated by the arrows.

DESCRIPTION OF THE PREFERRED EMBODIMENT

Figure 8:
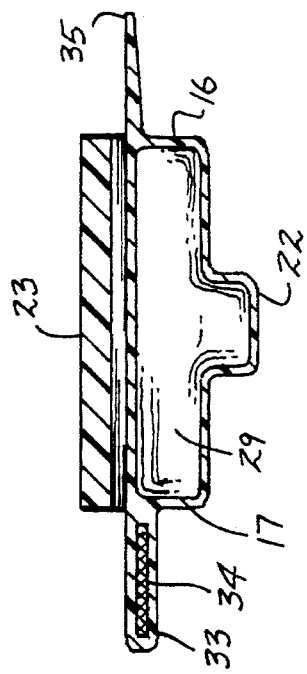
FIG. 8 is a cross-sectional view taken along the line 8—8 of FIG. 7, in the direction indicated by the arrows.
Figure 7:
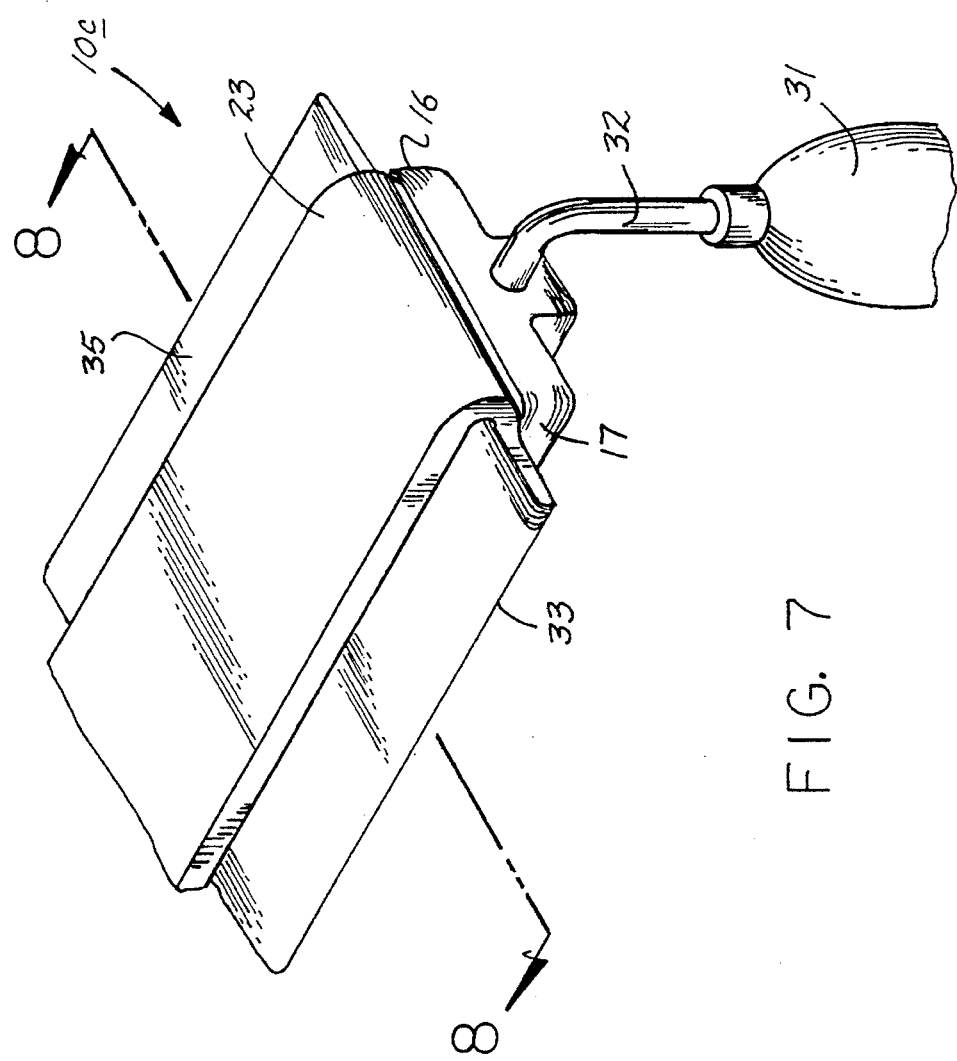
FIG. 7 is an isometric illustration of the invention to further include a magnetic adhering flap and flexible sealing plate mounted to the outer and inner side walls of the body.

With reference now to the drawings, and in particular to FIGS. 1 to 8 thereof, a new and improved vehicular windshield and hood seal embodying the principles and concepts of the present invention and generally designated by the reference numerals 10, 10a, 10b, and 10c will be described.

More specifically, the vehicular windshield and hood seal 10 of the instant invention essentially comprises interfitting between a vehicular windshield 11 and the hood 12 within the opening 13 typically employed to receive the windshield wipers therewithin. To prevent debris from entering the opening 13, an elongate flexible body is provided having a top wall 14 spaced from a bottom wall 15, a concave interior side wall 16 arranged to complementarily abut the windshield 11, and an outer side wall 17. First and second end walls 18 and 19 define the opposite ends of the elongate flexible body, wherein in the invention as indicated in FIG. 1 and as illustrated in FIG. 2, first and second handles 20 and 21 are fixedly mounted onto the top wall 14 adjacent the respective first and second end walls 18 and 19 for ease of manual manipulation of the organization in use.

The FIG. 3 indicates a modified seal 10a, wherein at the first and second end walls 18 and 19 are respective first and second wiping flaps 23 and 24 hingedly mounted thereto extending along the top wall 14, wherein free distal first and second flap first ends respectively having first and second positioning rods 27 and 28 terminating in respective first and second suction cups 25 and 26 to enhance positioning of the organization within the opening 13. The flexible respective first and second flaps 23 and 24 are arranged to hingedly mount in a pivotal relationship relative to the first and second ends 18 and 19 for removal of debris such as leaves, snow, and the like from the vehicle windshield upon removal of the seal structure 10a. It should be noted that a registration boss 22 mounted medially of the bottom wall 15 coextensive between the first and second ends 18 and 19 is arranged of a flexible construction to interfit within the opening 13 for enhanced sealing engagement of the structure in use preventing access of debris within the opening about the registration boss 22.

The seal structure 10b, as indicated in FIGS. 5 and 6, further employs the body member 30 to include coextensively thereof a pneumatic chamber 29 inflated through a manual pneumatic bulb 31 having a pneumatic conduit 32 in pneumatic communication between a bulb 31 and the chamber 29 to thereby further enhance sealing within the opening 13. The pneumatic chamber is coextensive of the body, as well as the registration boss 22, as illustrated in FIG. 6.

For additional securement to an associated vehicle, the seal structure 10c includes the outer wall flexible flap 33 mounted flexibly and hingedly to the outer wall 17, having a magnetic web 34 positioned therewithin for magnetic adherence to the hood structure, wherein an inner wall flexible flap 35 projecting coextensively of the inner wall 16 is arranged to sealingly engage the windshield to further enhance deflection of debris over the organization 10c, as illustrated, when positioned within the opening 13 of the associated vehicle.

As to the manner of usage and operation of the instant invention the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seal arranged for positioning within a vehicular opening oriented between a vehicular hood and vehicular windshield, wherein the seal comprises, an arcuate and elongate flexible body having a top wall spaced from a bottom wall, and an arcuate interior side wall arranged for positioning in adjacency to the vehicular windshield, and an outer side wall spaced from the interior side wall, and a first end wall spaced from a second end wall, and a registration boss of flexible construction coextensively directed along and integral to the bottom wall and projecting beyond the bottom wall and oriented between the first end wall and the second end wall and positioned in a spaced relationship between the outer side wall and the interior side wall;

the first end wall includes a first flexible wiping flap hingedly mounted to the first end wall, and the second end wall includes a second flexible wiping flap hingedly mounted to the second end wall, the first wiping flap including a first wiping flap free end, the second wiping flap including a second wiping flap free end, with a first positioning rod extending from the first wiping flap free end, and the first positioning rod including a first suction cup arranged for securement to the vehicular windshield, with the second wiping flap free end including a second positioning rod, and the second positioning rod including a second suction cup arranged for securement to the vehicular windshield.

2. A seal as set forth in claim 1 wherein the body includes a pneumatic chamber coextensive with the body, with the pneumatic chamber extending throughout the registration boss, with a pneumatic conduit extending from the pneumatic chamber in pneumatic communication therewith, and the pneumatic conduit including a pneumatic bulb arranged for effecting selective inflation of the pneumatic chamber.

3. A seal as set forth in claim 2 wherein the outer side wall includes an outer wall flexible flap having a magnetic web encased therewithin for magnetic adherence to the vehicular hood, wherein the interior side wall includes a flexible interior wall flap arranged for engaging the vehicular windshield for deflection of debris over the body.

* * * * *